United States Patent [19]

Lyons

[11] Patent Number: 4,942,503

[45] Date of Patent: Jul. 17, 1990

[54] GASEOUS DISCHARGE TUBE AND POWER SUPPLY ASSEMBLY

[75] Inventor: Harold W. Lyons, Killingworth, Conn.

[73] Assignee: Minnesota Mining and Manufacturing Company, St. Paul, Minn.

[21] Appl. No.: 345,000

[22] Filed: Apr. 28, 1989

[51] Int. Cl.[5] ............................................. B60Q 1/52
[52] U.S. Cl. ..................................... 362/74; 362/263; 362/368; 340/472
[58] Field of Search .................. 362/61, 74, 240, 249, 362/263, 329, 351, 359, 360, 368, 221-223, 217, 328, 264, 265, 373; 340/471, 472

[56] References Cited

U.S. PATENT DOCUMENTS

| | | | |
|---|---|---|---|
| 3,293,426 | 12/1966 | Zeitz et al. | 362/221 |
| 4,189,709 | 2/1980 | Goswiller | 362/217 |
| 4,334,211 | 6/1982 | McConnell et al. | 362/217 |
| 4,477,863 | 10/1984 | Ualz | 362/221 |
| 4,493,013 | 1/1985 | Hawkins | 362/329 |
| 4,595,904 | 6/1986 | Gosswiller et al. | 340/472 |
| 4,620,268 | 10/1986 | Ferenc | 362/74 |

Primary Examiner—Ira S. Lazarus
Assistant Examiner—Richard R. Cole
Attorney, Agent, or Firm—Donald M. Sell; Walter N. Kirn; William B. Barte

[57] ABSTRACT

An assembly having a gaseous discharge tube and circuitry therefore that is operable for providing light signals for the control of traffic control lights. The assembly is mountable as a part of a light bar assembly of the type mounted on police vehicles. The assembly includes a U-shaped channel member having a hollow protrusion with an opening with the gaseous discharge tube and the reflector therefor secured to the U-shaped member at the opening with the circuitry, which is mounted on a circuit board, carried by a support member that is secured to the U-shaped channel member. The support member has a portion that prevents moisture from reaching the circuitry.

7 Claims, 3 Drawing Sheets

GASEOUS DISCHARGE TUBE AND POWER SUPPLY ASSEMBLY

BACKGROUND OF THE INVENTION

The invention presented herein relates to an assembly including a gaseous discharge tube and circuitry therefor that is operable for providing light signals for the control of traffic control signals and in particular to such an assembly that is mountable as a part of a light bar assembly which has other light sources, such light bar assembly being of the type that is mounted on the top of an emergency or public safety vehicles, such as police and fire department vehicles.

A lightbar assembly, of the type shown in U.S. Pat. No. 4,620,268 to Robert Ferenc, that is mountable on the roof of an emergency or public safety vehicle has been sold and is currently available. The assembly disclosed in the patent has an I-beam structure member as a central support member. The I-beam structure member is a metal extrusion having locking grooves extending the length of the I-beam in the edges of the upper and lower flange portion of the I-beam. The I-beam flanges are also provided with aligned upper and lower integral locating grooves which receive support brackets for the light reflectors used with the light sources of the lightbar. The locating grooves also extend the length of the I-beam and are located a short distance from the edges of the I-beam flanges so the outermost surface of the light reflectors mounted on the I-beam are nearly flush with the edges of the upper and lower I-beam flanges. Lens sections for the light plus dividers and associated gaskets for the lens sections are received in the upper and lower locking grooves of the I-beam and extend forward of the edges of the I-beam flanges.

There is need for a compact assembly including a single gaseous discharge tube and power supply therefor that can be mounted between the upper and lower flanges of the I-beam of a lightbar assembly of the type disclosed in U.S. Pat. No. 4,620,268, supra. It is desirable also that such an assembly be one that can be fitted readily on existing lightbar assemblies of the type disclosed in the above-mentioned patent and for aesthetic reasons should be capable of being positioned centrally of the lightbar assembly. Such an assembly is usable to provide a gaseous discharge tube that is operable to produce signals that can be detected to initiate the operation of circuitry that is effective to control traffic control lights.

SUMMARY OF THE INVENTION

The need for a compact assembly including a single gaseous discharge tube and circuitry therefor that can be mounted between the upper and lower flanges of an I-beam, which provides the support structure of a lightbar assembly, is provided by the invention presented herein. An assembly is provided that includes an elongated U-shaped channel member having a hollow protrusion extending outwardly of the channel member portion that joins the legs of the U-shaped channel member, the hollow protrusion having an opening with a first subassembly that includes a gaseous discharge tube and reflector therefor secured to the U-shaped member at the opening plus a second subassembly including a flat circuit board having an opening and carrying circuitry connectable to the gaseous discharge tube for controlling its operation, and a support member removably secured to the U-shaped channel member, the support member having a first portion to which the circuit board is removably secured to position the circuit board for receiving a portion of the first subassembly within the opening in the circuit board and also position the circuit board generally parallel to the portion of the U-shaped channel member that connects the legs of the U-shaped channel member. The support member also has a second portion that is above the circuit board and extends the length of the circuit board to drain away from the circuit board any moisture that may reach the second portion when it is mounted on a lightbar. The support member can take the form of a U-shaped support member wherein the first portion of the support member is provided by the portion of the U-shaped support member that is present between the legs of the U-shaped support member with the second portion of the support member being provided by one of the legs of the U-shaped support member. The U-shaped channel member also has at least two mounting posts formed as an integral part of the U-shaped channel member. The mounting posts extend from the channel member portion that joins the legs of the U-shaped channel member. Each mounting post has a central bore extending the length of the mounting post and through the U-shaped channel member.

The opening provided in the hollow protrusion of the U-shaped channel member is closed off from the inside of the U-shaped channel member by the gaseous discharge tube and its reflector except for a portion of the opening near each leg of the U-shaped channel member to provide a path for air flow past the gaseous discharge tube. The hollow protrusion is formed with a ledge at the opening in the hollow protrusion which provides an outer mounting surface to which a lens is secured which extends over the opening in the hollow protrusion to protect the gaseous discharge tube.

DESCRIPTION OF THE DRAWING

The invention presented herein will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

DETAILED DESCRIPTION

Figure 2:
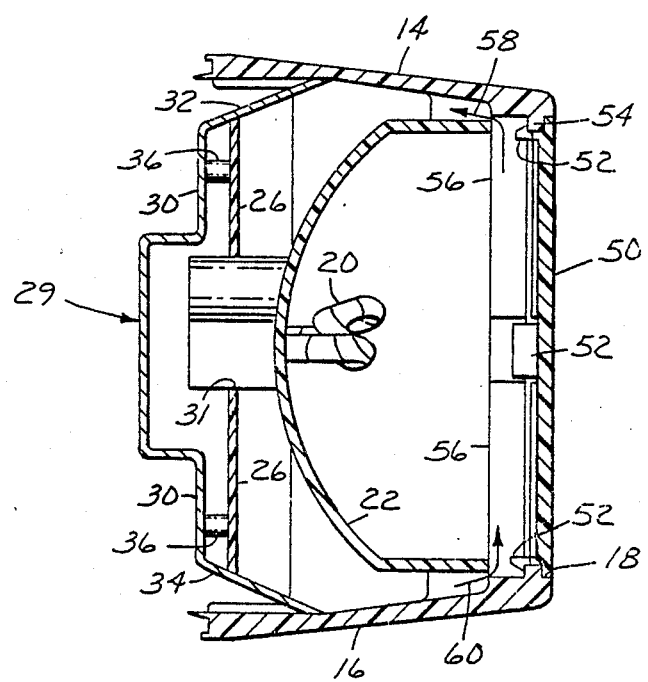
FIG. 2 is an enlarged sectional view of a portion of the assembly taken along line 2—2 in FIG. 1.
Figure 3:
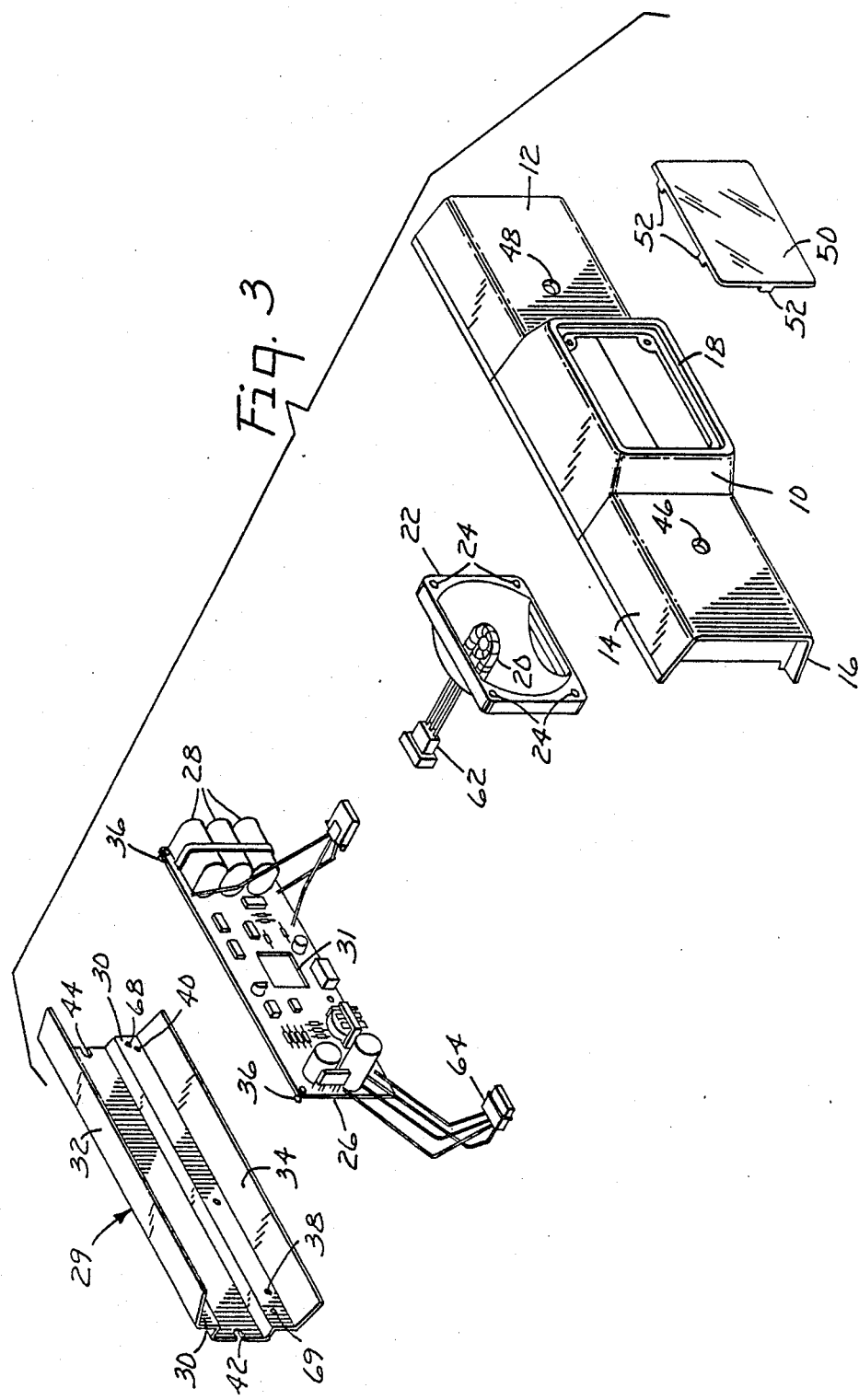
FIG. 3 is an exploded perspective view of the assembly of FIG. 1.

Referring to FIG. 3 of the drawing, an exploded perspective view of the assembly embodying the invention is shown. The assembly includes an elongated, U-shaped channel member 12 that can be molded using a high impact, plastic material, such as polycarbonate, GE 123-12 available from the General Electric Company. The U-shaped channel member has a centrally located hollow rectangularly shaped protrusion 10 that extends outwardly from the portion of channel member portion that joins the legs 14 and 16 of the channel member. The protrusion 10 has an opening 18. The assembly also includes a first subassembly including a gaseous discharge tube 20 and a reflector portion 22 in which the tube 20 is positioned. Such subassembly is positioned in the protrusion 10 and is bolted to it via the mounting holes 24 provided in the reflector portion 22 and corresponding mounting holes provided by two ledges 55 and 56 within the opening 18 of the protrusion 10. A second subassembly is also provided that includes a flat circuit board 26 on which circuitry for operation of the gaseous discharge tube is mounted with the circuit components, such as that identified by reference number 28, mounted on the side of the circuit board facing the channel member 12. The circuit board 26 has an opening 31 in which a portion of the gaseous discharge tube 20 is received as shown in FIG. 2. The portion of the gaseous discharge tube 20 within the opening includes the trigger transformer needed for use with the tube 20. The second subassembly also includes a support member 29 having a first portion 30 to which the circuit board 26 is removably secured. The circuit board is secured at each of its corners to the portion 30 via fasteners (not shown), such as screws, with the circuit board spaced a short distance from the portion 30 via spacers 36 that are permanently secured to the circuit board with each having a central bore for receiving the screws. Two of four holes in the portion 30, through which the screws used with the spacers 36 pass to secure the the circuit board 26, are shown at 38 and 40. As can be seen in FIG. 3, the circuit board 26 is shorter in length than the portion 30 which in turn is shorter than the channel member 12. Two notches 42 and 44 are provided at the end portions of the portion 30 of the support member 29 and are positioned to be in line with the holes 46 and 48, respectively, in the channel member 12 when the portion 30 of the support member 29 is secured to the channel member 12. As can be seen in FIG. 2, which is a sectional view of the assembly, the circuit board 26 is then generally parallel to the portion of the channel member 12 that connects the legs 14 and 16 of the channel member 12. The support member 29 for the circuit board 26 also has a second portion 32 that is positioned above the circuit board 26 and extends the length of the circuit board. The portion 32 of the support member 29 is positioned within the legs 14 and 16 of the channel member 12 and extends in a direction opposite to that of legs 14 and 16. The free end of portion 32 is higher than the other end of portion 32 so the portion 32 serves to shelter the circuit board 26 from any moisture that may enter the assembly via the edge at the free end of leg 14 of channel member 12 when the assembly is mounted as a part of a lightbar of the type disclosed in U.S. Pat. No. 4,620,268 supra, which is incorporated therein by reference, with the edges of the free end of legs 14 and 16 of the channel member abutting the edges of the upper and lower flange portions of the I-beam structure that forms a part of such a lightbar. As shown in FIGS. 2 and 3, an elongated U-shaped support member 29 is used to provide a support member 29 just described. The first portion 30 of the support member 29 is provided by the portion of the U-shaped support member 29 that joins the two legs 32 and 34 of the U-shaped support member 29 with the leg 32 providing the second portion 32 of the support member 29.

Figure 1:
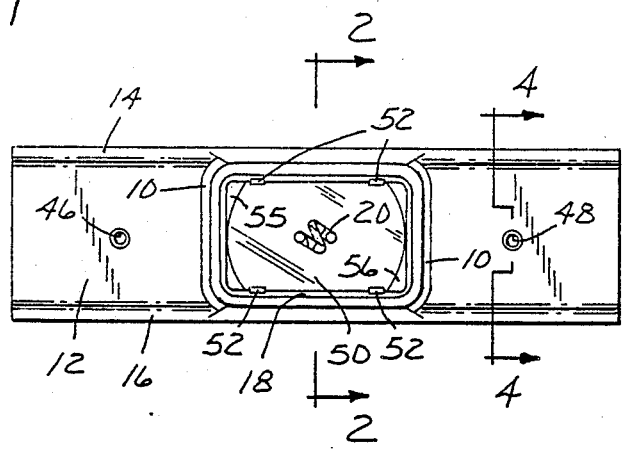
FIG. 1 is a front view of the assembly embodying the invention.

The opening 18 provided in the protrusion 10 is closed off by a lens 50 that has several locking tabs 52 for removably holding the lens in place as shown in FIG. 1. The protrusion 10 is formed with a ledge portion 54, as shown in FIG. 2, that extends inwardly at right angles to the center axis of the protrusion 10. The ledge portion 54 presents a flat surface for receiving the outer edge portion of the lens and presents a thickness at the tabs 52 to allow a locking ledge on each of the tabs 52 to snap about the edge of the ledge portion 54 to hold the lens 50 in place. An opening is provided in the lens 50 adjacent each of the tabs 52 to enable tabs 52 to be moved from a locked position for removal of the lens from the protrusion 10. A second ledge portion 55 is formed that abuts the ledge portion 54 on the left as viewed in FIG. 1, except where the tab 52 for that portion of the ledge portion 54 is received. A third ledge portion 56, similar to the second ledge portion is provided that abuts the ledge portion 54 on the right as viewed in FIG. 1, except where the tab 52 for that portion of the ledge portion 54 is received. A ledge portion similar to portions 55 and 56 is not present with the ledge portion 54 at the top or bottom as viewed in FIG. 1 so a passage for air is present between the reflector 22 and the lens 50 allowing for air flow as indicated by the two arrows 58 and 60. As seen in FIG. 2, the second and third ledge portions 55 and 56 present a flat surface for receiving the end surface of the reflector 22 for the gaseous discharge tube 20. As can be seen in FIG. 1, the ledge portions 55 and 56 extend beyond the ledge portion 54 to provide a means by which the reflector 22 can be secured to the protrusion 10 of the U-shaped channel member 12. Holes are provided in the ledge portions 55 and 56 which align with the mounting holes 24 in the reflector 22 for securing the reflector 22 to the protrusion 10 by the use of nuts and bolts (not shown).

Referring to FIG. 3, the necessary connecting conductors from the gaseous discharge tube 20 for its operation are terminated in a multiple wire connector 62 which is used to make connections with conductors from the circuitry carried by the circuit board 26 which terminate at a multiple wire connector 64 that is connectable to the connector 62.

Figure 4:
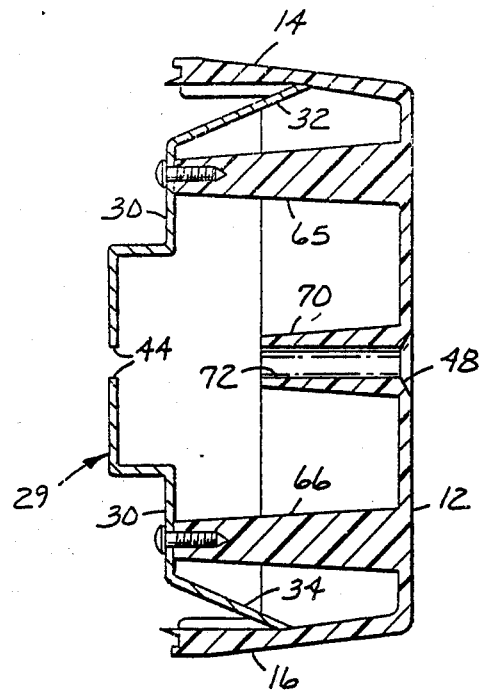
FIG. 4 is an enlarged sectional view of a portion of the assembly taken along line 4—4 of FIG. 1.

Referring to FIG. 4, which is an enlarged sectional taken along line 4—4 of FIG. 1, two mounting posts 65 and 66 are shown. The posts are formed as an integral part of the U-shaped channel member 12 and have a small, central bore in their ends. Holes are provided in the portion 30 of the support member 29, FIG. 3, such as the hole 68, which are positioned to align with the ends of posts 65 and 66. Screws are then usable via the holes to secure the support member 29 via the portion 30 to the channel member 12. Two additional mounting posts, similar to mounting posts 65 and 66, are similarly located at the other end portion of the channel member 12 with aligned holes such as hole 69, provided in the portion 30 of the support member 29 for further attachment of the support member to the channel member 12 via screws.

A third mounting post 70 is shown in FIG. 4. It may be longer or shorter than the posts 65 and 66, and like posts 65 and 66 is formed as an integral part of the channel member 12. It has a small central bore 72 that extends the length of the post 70 and through the channel member 12 to provide the hole 48 shown in FIGS. 1 and 3. A bolt (not shown) can be passed through the hole 48 and the bore 72 and past the notch 44 (FIG. 3) for use in securing the entire assembly to a lightbar of the type disclosed in U.S. Pat. No. 4,620,268 supra. A mounting post similar to mounting post 70 is located in alignment with hole 46 in the channel member 12 to provide for the use of another bolt for further securing the assembly to a lightbar.

The particulars of the foregoing description are provided merely for purposes of illustration and are subject to a considerable latitude of modification without departing from the novel teachings disclosed therein. Accordingly, the scope of this invention is intended to be limited only as defined in the appended claims, which should be accorded a breadth of interpretation consistent with this specification.

What is claimed:

1. An assembly for mounting on a lightbar including:
   an elongated U-shaped channel member having two legs and a portion which joins said legs, means for attaching said member to said lightbar, and a hollow protrusion extending from said U-shaped channel member at said portion, said hollow protrusion having an opening;
   a first subassembly secured within said hollow protrusion at said opening including a gaseous discharge tube and a reflector for said gaseous discharge tube;
   a second subassembly including a U-shaped support member, a circuit board having a circuitry for operation of said gaseous discharge tube removably secured to said support member, said support member removably secured to said U-shaped channel member with said circuit board positioned generally parallel to a portion of the U-shaped support member connecting two legs of the U-shaped support member.

2. An assembly according to claim 1 wherein said support member has a first portion and a second portion, wherein said circuit board is removably secured to said first portion of said support member, said second portion positioned along one edge of said circuit board and extending the length of said circuit board whereby any moisture reaching the side of said second portion that is away from said circuit board is prevented from reaching said circuit board.

3. An assembly according to claim 2 wherein said support member is an elongated U-shaped support member wherein said first portion is the portion of said U-shaped support member that connects the legs of said U-shaped support member and said second portion is one leg of said U-shaped support member.

4. An assembly according to claim 1 wherein said U-shaped channel member has a plurality of mounting posts whereby said support member is removably secured to said mounting posts.

5. An assembly according to claim 1 wherein said circuit board has an opening in which a portion of said first subassembly is received.

6. An assembly according to claim 1 further including a lens removably mounted on said hollow protrusion and covering said opening of said hollow protrusion.

7. An assembly according to claim 6 wherein said lens is spaced from said gaseous discharge tube allowing for the flow of air between said lens and said gaseous discharge tube.

* * * * *